Figure 1:
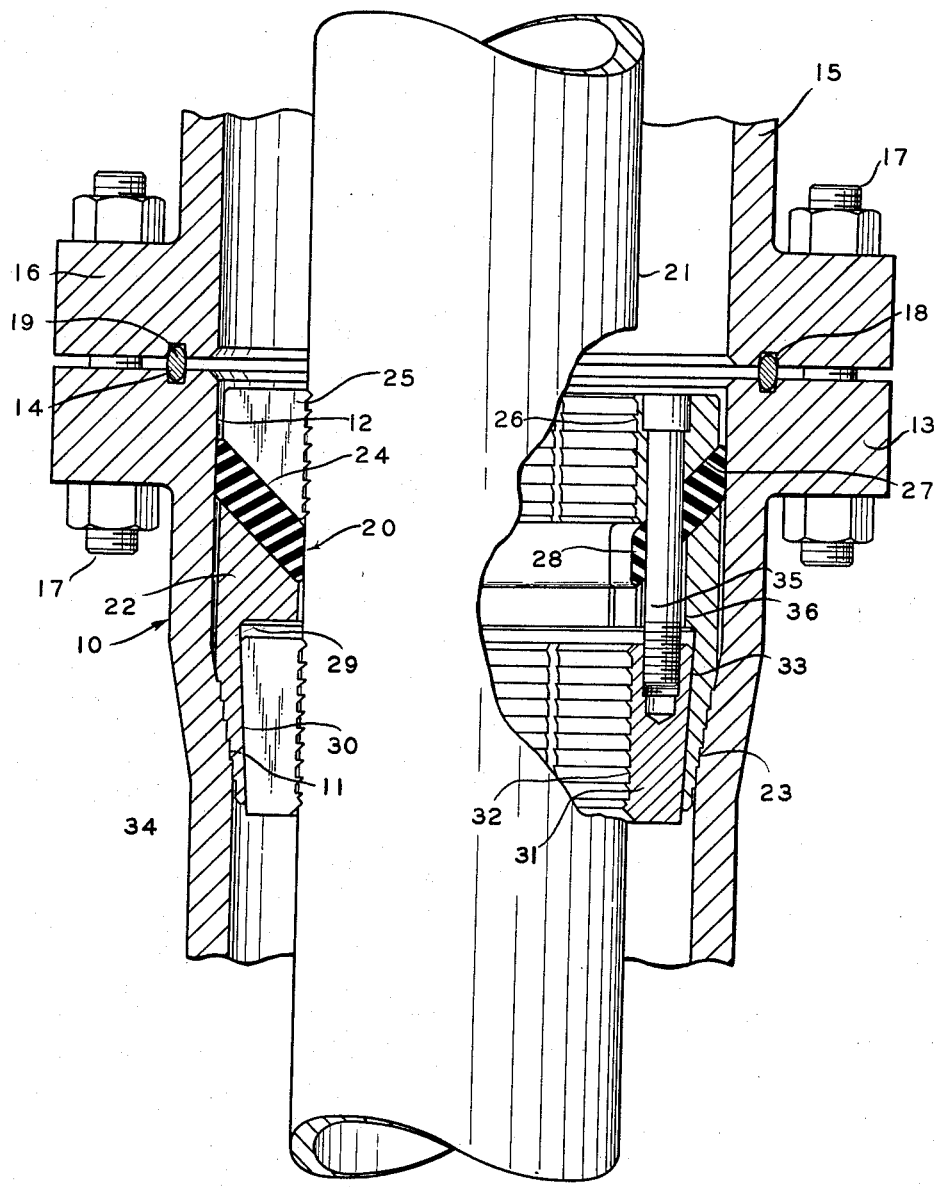

Jan. 12, 1960      H. ALLEN      2,920,909
HANGING APPARATUS

Original Filed Oct. 27, 1955      3 Sheets-Sheet 1

HERBERT ALLEN
*INVENTOR.*

BY
Brownings, Simmes & Ayer
ATTORNEYS

Jan. 12, 1960

H. ALLEN 2,920,909

HANGING APPARATUS

Original Filed Oct. 27, 1955

3 Sheets-Sheet 2

HERBERT ALLEN
*INVENTOR.*

BY

Browning, Simms & Hyer

ATTORNEYS

Jan. 12, 1960 H. ALLEN 2,920,909
HANGING APPARATUS
Original Filed Oct. 27, 1955 3 Sheets-Sheet 3

HERBERT ALLEN
*INVENTOR.*

BY
*Browning, Simms & Hyer*
ATTORNEYS

United States Patent Office 2,920,909
Patented Jan. 12, 1960

2,920,909

HANGING APPARATUS

Herbert Allen, Houston, Tex., assignor to Cameron Iron Works, Inc., Houston, Tex., a corporation of Texas Continuation of application Serial No. 543,215, October 27, 1955. This application May 12, 1958, Serial No. 735,092

7 Claims. (Cl. 285—146)

This invention relates generally to apparatus of the type employing wedge-shaped slips for fixedly locating one member against longitudinal movement relative to a seating surface of another member. More particularly, this invention relates to an improved assembly of this type for use in hanging and sealing pipe within a wellhead fitting or the like.

This application is a continuation of my copending application Serial No. 543,215, filed October 27, 1955, and entitled "Hanging Apparatus."

In the wellhead art, these slips are provided with teeth on an inner surface thereof to grip the pipe and resist downward movement thereof. The outer surface of the slips is relatively smooth and tapered correspondingly to a surface within the wellhead fitting for sliding thereover inwardly and downwardly of the bowl as the weight of the pipe is placed on the slips. Thus, as the slips grip the pipe they are pulled downwardly by its weight and wedged tightly between the pipe and tapered surface to cause the teeth on their inner surfaces to bite into the pipe. However, it has been found that with ever-increasing lengths of pipe, and consequently higher loads, the slips often not only bite into the pipe surface to hang same but also actually deflect the pipe to an extent such that the inner diameter thereof will not accommodate various well tools designed for passage therethrough.

It is, therefore, an object of this invention to provide an assembly of this type which is so constructed as to reduce pipe deflection to a minimum and, more particularly, to such an assembly adapted for use in a standard wellhead fitting.

This and other objects are accomplished by the provision of an assembly constructed in such a manner that the slips are movable inwardly of the pipe at a relatively slow rate per unit of downward movement as the weight of the pipe is initially placed thereon and while the load on the slips is low. However, toward the end of the hanging operation as the entire weight of the pipe is placed on the slips and the load nears the maximum, the slips are caused to move inwardly at a relatively fast rate per unit of downward movement. In this manner, the force tending to deflect the pipe is relatively great as compared to the load as such load is initially placed on the slips so that the slip teeth bite into the pipe to support same. Then, as the pipe is supported by this initial force, further loading results in the pipe-deflecting force being reduced as compared to the load on the slips.

In its preferred form, the assembly of this invention includes a body seatable in a wellhead fitting and having a surface tapered correspondingly to the taper of the outer relatively smooth surface of a set of circumferentially separated slip segments. The slip segments are supported on the body surface for gripping said pipe and sliding inwardly and downwardly of the bowl, and the body is provided with a part extending thereacross and deformable upon downward movement of the slip segments. As a load due to the weight of the pipe is initially placed on the slip segments, the deformable base offers only small resistance to downward movement thereof, and there is substantially no inward movement of the slip segments. However, as the base is deformed into confinement between the pipe and fitting, it offers increased resistance to such downward movement and the slips move inwardly along the tapered body surface at a relatively rapid rate per unit of downward movement.

Deflection of the pipe is also reduced to a minimum by the provision of an assembly having a large pipe-surrounding area of slip teeth whereby the proportional load upon each tooth, and thus the amount of inward pipe-gripping movement thereof, may be reduced. This is accomplished, in accordance with the present invention, by an assembly which includes a body seatable in the fitting. This body is so constructed as to support one set of slips on an inwardly and downwardly tapered surface above the bowl, and another set of slips upon a tapered surface within a recess disposed substantially concentrically of the seat within the fitting. More particularly, the outer surface of the body is stepped to resist downward movement thereof within a tapered bowl which conventionally forms a seat within the fitting such that the taper of the bowl is nullified. When the slips thusly supported in the recess of the body move inwardly of the pipe as the weight thereof is placed on the slips, this movement will be along a tapered surface which forms a smaller acute angle with the bowl axis than does the bowl taper. Thus, the movement will be at a relatively slow rate of inward movement per unit of downward movement.

Another object is to provide an assembly of this type which, in addition to reducing pipe deflection to a minimum, also serves to seal off the space between the pipe and bowl.

Still another object is to provide an assembly of the type described in the foregoing object which includes a seal ring automatically expandable into sealed relation with the pipe and bowl as the weight of the pipe is placed on the slips.

A further object is to provide an assembly of the type described in the foregoing object which is so constructed that pressures within the well beneath the assembly will not blow the assembly out of its pipe-gripping position.

For the above purposes, the deformable base for the slips may comprise an annular seal ring of resilient material surrounding the pipe and disposed across the body in position to be deformed into sealing engagement with the pipe and bowl. With the seal ring supported beneath those slip segments which are supported above the body, pressures from within the well beneath the assembly will exert a piston-like upward force upon the slip segments which, due to the downwardly and inwardly tapered surface of the slip segments and body, will urge the slip segments further inwardly of the pipe.

These upper slip segments may be connected to lower slip segments so that the seal ring is automatically compressed as the weight of the pipe is placed on the lower slips. Furthermore, both the upper and lower sets of slip segments may be supported by a bowl-shaped body seatable on the tapered bowl of a fitting, in a manner previously described. Thus, in its preferred form, the assembly of this invention includes a body from which the seal ring as well as both upper and lower sets of slip segments are supported. The connection between the upper and lower slip segments is so constructed as to permit relative inward movement between the upper slip segments slidable over a tapered surface having a deformable base, and thus at a rate of inward movement per unit of downward movement which increases as the seal ring is deformed into confinement, and to dispose the lower slips for sliding inwardly over the relatively rigid tapered surface of the body recess at a substantially constant and relatively slow rate per unit of downward movement.

It is yet a further object to provide a sectional pipe hanging and sealing assembly of the type above-described which is provided with novel means for hinging the sections thereof together to permit the assembly to be opened and wrapped around the pipe and then securely latched thereabout.

Other objects, advantages and features of this invention will be apparent to one skilled in the art upon a consideration of the written specification, the attached claims and the annexed drawings.

Figure 4:
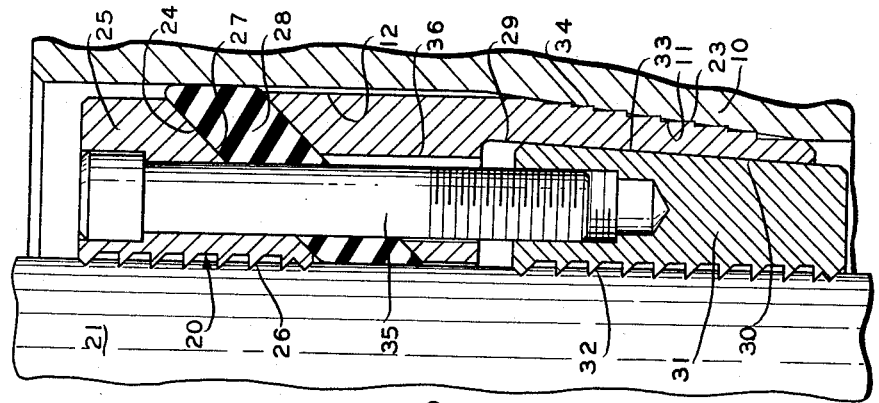
Figure 3:
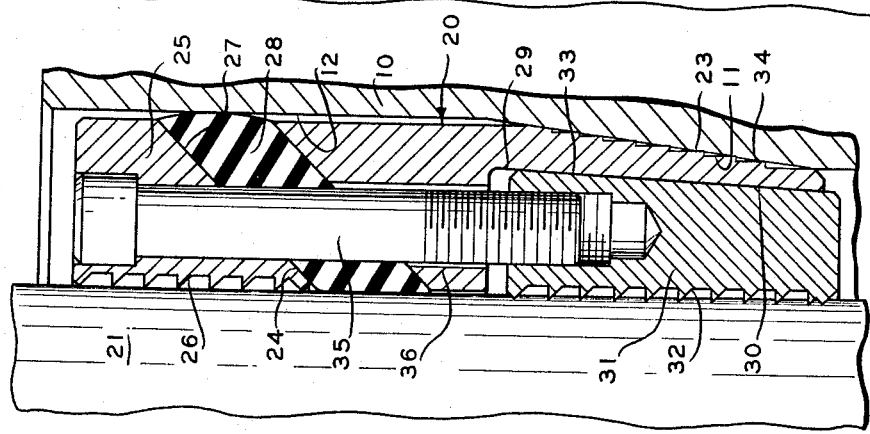
Figure 2:
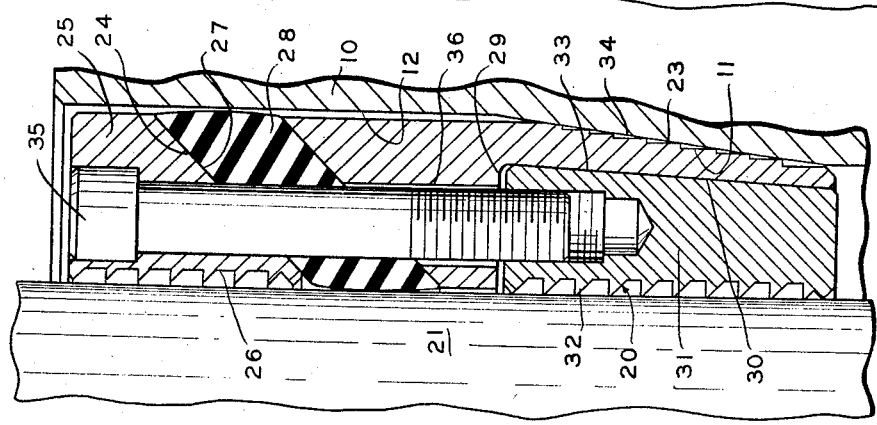
Figure 5:
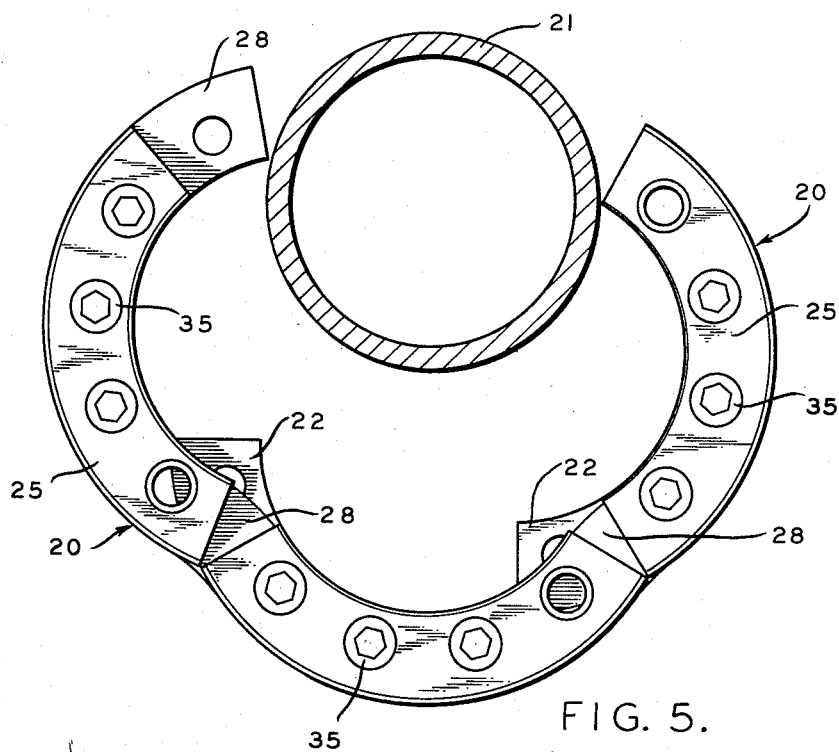
Figure 6:
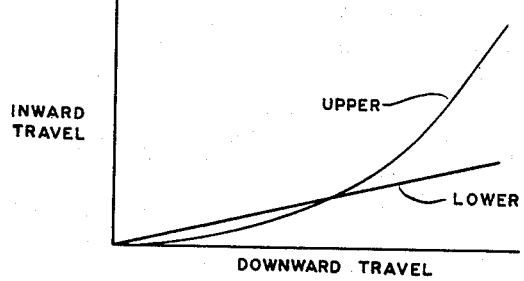

In the drawings, wherein like reference characters are used throughout to designate like parts:

Fig. 1 is a sectional view of a wellhead fitting in which a pipe is supported and sealed with respect thereto by means of an assembly constructed in accordance with this invention; Figs. 2, 3 and 4 are partial and enlarged sectional views of the assembly of the present invention, and illustrating sequentially the manner in which the slip teeth thereof bite into the pipe and the seal ring thereof is expanded into sealing relation with the pipe and bowl of the wellhead fitting as the weight of the pipe is placed upon the slips;

Fig. 5 is a plan view of the assembly in an open position for wrapping around the pipe; and Fig. 6 is a graph illustrating the rates of inward movement of the upper and lower slips of the assembly per unit of downward movement thereof as the weight of the pipe is placed thereon.

Referring now particularly to the drawings, there is shown in Figs. 1 to 4 a wellhead fitting 10 which may comprise a standard casing or tubing head having on its interior an inwardly and downwardly tapered bowl portion 11 which forms a seat and a substantially cylindrical portion 12 above the bowl. The upper end of the head 10 adjacent cylindrical portion 12 is provided with an outwardly projecting flange 13 having an annular recess 14 on its upper surface. A fitting 15, which may be a blowout preventer, is disposed above the head 10 and provided with a flange 16 at its lower end for connection to the head by means of bolts 17 extending through the flanges. The flange 16 of fitting 15 is also provided with an annular recess 18 adapted to be disposed opposite recess 14 of the head 10 so that a conventional type seal ring 19 may be received within and compressed between the recesses for sealing the fittings with respect to one another as they are drawn together and made up by the bolts 17.

The assembly 20 of the present invention is supported within the bowl 11 of head 10 for the purpose of hanging and sealing the pipe 21, which may be a casing or tubing, with respect to such head. As well known in the art, it is often desirable in the completion of a well to hang and provide such a seal about the outside of an inner string of pipe prior to removal of the control equipment, such as the blowout preventer 15, which is customarily employed on a well. Thus, in this completion operation, the pipe 21 will have been run into the well through the head 10 and blowout preventer 15 to the position at which it is desired to hang and seal same. With the pipe held suspended by suitable hoisting apparatus used in running the pipe, the assembly 20 is opened up, as indicated in Fig. 5 and as will be explained more fully hereinafter, so as to permit it to be wrapped around and latched in place about the pipe 21 at a location above the blowout preventer. Upon opening of the preventers, the assembly is permitted to pass downwardly along the pipe and to land in the bowl 11 of the head 10, at which time the weight of the pipe is eased off of the hoisting apparatus and placed upon the slips of the assembly. As will be described more fully hereinafter, the assembly is automatically operable in response to the weight of the pipe being placed thereon to hang and seal same with respect to the head 10.

Although the assembly of this invention is especially well suited for the above-described use, and thus is particularly described in connection therewith, it is to be understood that its novel concepts are not limited to such a use.

The assembly 20 includes a body 22 formed of a plurality of segments and having an outer surface 23 tapered inwardly and downwardly correspondingly to the bowl 11 for seating thereon. An upper surface 24 on the body is also tapered inwardly and downwardly and provides a support for upper slip segments 25, each of which is provided with an inner toothed surface 26 for resisting downward movement of the pipe 21 and an outer relatively smooth surface 27 tapered inwardly and downwardly correspondingly to upper body surface 24 for sliding movement thereover.

The base of upper surface 24 of body 22 is provided with a deformable element 28 which comprises an annular seal ring of rubber or like material surrounding the pipe 21 and disposed across the body. It will be understood that with surface 23 firmly seated upon bowl 11 a rigid support is provided for the deformable seal ring 28 such that as a load due to the weight of the pipe is placed upon slip segments 25 so as to pull them downwardly, the ring will be deformed and expanded into sealed relation with both the pipe and the cylindrical portion 12 of the head 10, as shown in Figs. 1 and 4. It will also be understood that during the early part of the downward movement of the slip segments 25, the deformable seal ring 28 will offer little resistance thereto such that there will be little, if any, inward movement of the slip segments. However, as the ring 28 is further deformed into confinement between the pipe and fitting so as to provide a substantially rigid support, the vertical component thereof disposed behind the outer surface of the slip segments will urge the slip segments inwardly of the pipe at a rate per unit of downward movement thereof at least substantially corresponding to the taper of surfaces 24 and 27.

The above-described movement of the upper slip segments 25 is shown diagrammatically upon the graph of Fig. 6. As shown therein, during the initial stages of downward movement of the slip segments 25 in response to a load due to the weight of the pipe being placed thereon, the lateral or inward travel of the slips per unit of downward travel is very small. During the final stages of such movement, however, the inward movement of the slip segments 25 per unit of downward movement thereof is relatively rapid, as shown by the upper portion of the line indicating upper slip segment movement. At an intermediate stage, there may be some compression of the rubber seal ring and a gradually increasing resistance to deformation, so that the slip segments are caused to move inwardly at an increasing rate.

With the teeth upon surface 26 of the slip segments 25 gripping the surface of pipe 21, it can be seen that pressures within the well in the annulus between pipe 21 and the head 10 beneath the assembly 20 will serve to cause the slips to more fully grip the pipe. That is, with the surfaces 24 and 27 tapered inwardly and downwardly, such pressures will exert a force on the seal ring 28 and slips which has an inwardly directed component for urging the slip segments 25 into more tightly gripping relation with the pipe. Thus, with the novel construction of the present invention, there is added assurance that the assembly will not be blown out due to crossover pressures within the well.

The body 22 is substantially bowl-shaped and is provided on its inner surface with a recess 29 arranged substantially concentrically of outer seating surface 23. This recess 29 is provided with a relatively steep inwardly and downwardly tapered surface 30 and receives lower slip segments 31 for movement inwardly into gripping relation with the pipe upon inward movement of the body segments and sliding along the tapered surface at a relatively slow rate per unit of downward movement as the weight of the pipe is placed thereon. That is, the inner surface 32 of slip segments 31 is provided with upwardly directed teeth for resisting downward movement of the pipe 21 and the outer surface 33 thereof is relatively smooth to permit downward and inward sliding movement of the slips over the recess surface 30. Inasmuch as surface 30 provides a rigid support for slips 31, the inward movement of such slips per unit of downward movement thereof will be at a constant relatively slow rate, as illustrated by the graph of Fig. 6.

From the foregoing, and especially with recess 29 disposed substantially concentrically within outer surface 23 of the body 22, it can be seen that substantially the entire height of the assembly is provided with toothed surfaces for engaging the pipe. Thus, previously mentioned, there is provided a large amount of pipe gripping surface, such that each tooth may support a proportionately smaller amount of the total load imposed by the pipe. As a result, each tooth bites into the outer pipe surface just that much less and there is considerably less opportunity for pipe deflection.

The outer surface 23 of body 22 is provided with downwardly facing steps 34 for resisting downward movement of the body within the bowl 11. As a load is imposed upon the body, the steps 34 will dig into the bowl such that the body becomes in effect an integral portion of the bowl, and the slip segments 31 are permitted to move downwardly and inwardly, as the weight of the pipe is placed thereon, according to the taper of surfaces 30 and 33. That is, when firmly embedded in the bowl 11, the steps 34 of the body serve not only to provide a stationary support against which seal ring 28 is deformed, but also to nullify the taper of bowl 11 such that the lower slip segments 31 can, as shown, be caused to move inwardly of the pipe at a relatively slow rate per unit of downward movement.

The upper slip segments 25 are connected to lower slip segments 31 by means of bolts 35 which extend through the seal ring 28 and body 22. Thus, the seal ring 28 is deformed and expanded in response to downward movement of slip segments 31 as the weight of the pipe is placed thereon. As will be apparent from the description to follow, although the bolts 35 provide a substantially rigid connection between the upper and lower slip segments as far as relative vertical movement therebetween is concerned, they also provide a relatively loose connection as far as relative lateral movement is concerned. Furthermore, the body is provided with enlarged passages 36 therethrough of a size to permit such relative lateral movement.

With reference to Fig. 2, it can be seen that as the weight of the pipe is first eased off of the hoisting apparatus and onto the assembly 20, the outer surface of the pipe 21 will first engage the teeth upon the lower slip segments 31 and cause them to grip and bite into the pipe a very small amount. This small increment of downward movement, and still smaller amount of inward movement, of the lower slip segments 31 will deform the seal ring 28 only slightly so that its expansion laterally towards the pipe 21 and cylindrical portion 12 of the head 10 is also small. Inasmuch as the seal ring is rather freely deformable at this stage of the hanging operation, the downward movement of slip segments 31 serves principally to move the upper slip segments 25 downwardly with little, if any, corresponding inward movement thereof. Inasmuch as the steps 34 on body surface 23 offer less frictional resistance to sliding than do the teeth upon toothed surface 32 of the lower slip segments 31, the steps 34 will not at the stage shown in Fig. 2 have bitten into the bowl 11.

However, as the weight of the pipe 21 continues to be eased off of the hoisting apparatus and onto the assembly 20, the lower slip segments 31 are caused to bite further into the pipe surface and thereby produce a wedging action which slows down the descent of the pipe and forces the steps 34 to begin to bite into the bowl 11, as shown in Fig. 3. At this stage of the hanging operation, the further downward movement of slip segments 31 will have served to further deform and expand the seal ring laterally toward sealing engagement with the pipe and cylindrical surface 12 of the head. Although the continued downward movement of the lower slip segments 31 will have also caused a corresponding downward movement of upper slip segments 25, there will have been a very small amount of inward movement of the upper slip segments inasmuch as the seal ring is still relatively free to be deformed. A graphic illustration of this movement is represented by the lower portion of the curve of the upper slip segment movement shown in Fig. 6. That is, although there is at this time a certain amount of inward movement of the upper slip segments per unit of downward movement, such inward movement is still at a considerably slower rate per unit of downward movement than that of the lower slips.

The final stage of the hanging operation wherein the descent of the pipe has been gradually brought to a halt is illustrated in Fig. 4. As shown therein, the toothed surface upon the lower slip segments 31 has fully bitten into the pipe surface and the steps 34 are embedded within the bowl 11 to make the body 22 of the assembly substantially integral therewith. At the same time, the seal ring 28 has been fully deformed and expanded into sealing relation between the pipe and head, and the upper slip segments 25 have moved inwardly of the pipe 21 so as to be firmly embedded therein. It will be understood that between the positions of Fig. 3 and Fig. 4, the upper slip segments 25 will have moved inwardly of the pipe at an increased rate of inward movement per unit of downward movement thereof. Thus, again with reference to the graph of Fig. 6, it will be seen that in the final stages of the hanging operation the upper slip segments will assume a rate of inward movement per unit of downward movement considerably greater than that of the lower slip segments.

Thus, during the initial stages of the hanging operation when the load of the pipe is taken by the slips during movement thereof according to a steep taper, the force exerted by the slips is relatively large as compared to the load thereon. Then, however, as the slips firmly grip the pipe to support the weight of same, a substantial portion of the load is taken by the upper slips during their movement over a considerably less steep taper such that the force exerted toward the end of the hanging operation is relatively small as compared to the load thereon.

As is common in the art, the slips and body are segmented so as to permit the above-described movement thereof radially inwardly of the bowl of the head as mit the assembly to be both wrapped around and removed also conventional in the art, the seal ring 28 is continuous except for a single separation or split therealong so that the assembly may be opened with the split ring serving as a hinge, and then wrapped around the pipe, as shown in Fig. 5 and as mentioned above.

In the construction of the present invention, each of the upper and lower slips is formed of three segments, the separations between upper slip segments being aligned with the separations between lower slip segments, as best shown in the portion of Fig. 1 wherein the pipe 21 has been broken away. The body 22 is also formed of three segments, with the separations therebetween being offset with respect to the separations between the upper and lower slip segments. As can be seen from Fig. 1, the split or separation between the annular seal ring 28 is substantially aligned with one of the separations between the body segments so that the assembly may be hinged upon the seal ring adjacent the other separations between the body segments, as shown in Fig. 5, to permit the assembly to be both wrapped around and removed from the pipe.

As shown in Fig. 5, the bolts 35 interconnecting the upper and lower slip segments include one bolt passing through the offset portion of each of the body segments. Upon opening of the assembly, the bolts for passing through the offset portions of the body segments are removed, as shown in Fig. 5, the bolt 35 through the offset portion having a separation aligned with the seal ring split serving as a means of latching the assembly in position about the pipe 21. Thus, the last-mentioned offset portion of the body segment serves as an interfitting key, such that upon aligning the opening through such offset portion as well as the overlying seal ring 28, a bolt 35 may be passed therethrough and threaded into the lower slip segment so as to latch the assembly in place. At this time, the other two bolts 35 which were removed during the wrap-around operation may be reinserted through the seal ring and body segments and threaded into the lower slip segments 31.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An assembly for hanging and sealing a pipe within a wellhead fitting or the like, comprising a body having an outer surface seatable in the fitting for limited movement inwardly of the pipe and downwardly of the wellhead fitting, pipe gripping slip segments received within a tapered recess about the inner surface of the body for sliding movement downwardly therealong, an annular seal ring split at one location about its length and supported by the body above the slip segments, an annular compression element above the seal ring, each of the body and compression element being formed of separate segments with substantially vertically aligned separations between compression element segments and slip segments being offset with respect to the separations between the body segments, bolts extending through the seal ring and body segments to connect the compression element segments with the slip segments for deforming the seal ring upon downward movement of the slip segments while maintaining the aligned relation of the separations therebetween, the seal ring split being arranged in substantial vertical alignment with one of the separations between the body segments, and one of said bolts extending through the offset adjacent the seal ring split.

2. An assembly for hanging a pipe within and from a downwardly and inwardly tapered bowl of a wellhead fitting or the like, comprising an annular body including a plurality of segments disposable between the fitting and pipe, said segments being circumferentially spaced apart and having outer surfaces tapered correspondingly to the bowl for seating thereon and sliding downwardly and inwardly therealong when so disposed, a first set of circumferentially spaced apart slip segments each having teeth thereon and supported by the body for movement downwardly with respect thereto, a second set of circumferentially spaced apart slip segments each having teeth thereon and supported by the first set of slip segments radially inwardly of the body segments so as to be forced inwardly into gripping relation with the pipe upon said inward movement of the body segments and then further inwardly of the pipe upon further inward movement of the body segments, said second set of slip segments being movable downwardly with respect to the body segments in downwardly force-transmitting relation to said first set of slip segments, as the load of the pipe is placed thereon, to move said first set of slip segments downwardly with respect to said body segments, and means responsive to said downward movement of said first set of slip segments for moving them inwardly into gripping relation with the pipe and then further inwardly of the pipe at a greater rate per unit of downward movement thereof than the corresponding rate of further inward movement of the second set of slip segments.

3. An assembly for hanging and sealing a pipe within and from a downwardly and inwardly tapered bowl of a wellhead fitting or the like, comprising an annular body including a plurality of segments disposable between the fitting and pipe, said segments being circumferentially spaced apart and having outer surfaces tapered correspondingly to the bowl for seating thereon and sliding downwardly and inwardly therealong when so disposed, a seal ring of deformable material including a portion supported by the body against downward movement with respect thereto and extending thereacross, a first set of circumferentially spaced apart slip segments each having teeth thereon and supported above the seal ring for movement downwardly with respect to the body segments, a second set of circumferentially spaced apart slip segments each having teeth thereon and supported by the first set of slip segments radially inwardly of the body segments so that said second set of slip segments are forced inwardly into gripping relation with the pipe upon said inward movement of the body segments and then further inwardly of the pipe upon further inward movement of the body segments, said second set of slip segments being movable downwardly with respect to said body segments in downwardly force-transmitting relation to said first set of slip segments, as the load of the pipe is placed on the second set of slip segments, to move said first set of slip segments downwardly with respect to the body segments and thereby deform said seal ring into sealing engagement between the pipe and fitting, and means responsive to deformation of the seal ring to move said first set of slip segments inwardly into gripping relation with the pipe and then further inwardly of the pipe at a greater rate per unit of downwatd movement thereof than the corresponting rate of further inward movement of the second set of slip segments.

4. An assembly of the character described in claim 3, including bolts extending through said seal ring and said body segments to support each of said second slip segments from one of said first segments, said bolts being received loosely through the body segments to permit relative inward movement of said first set of slip segments and said body segments.

5. An assembly for hanging and sealing a pipe within and from a downwardly and inwardly tapered bowl of a wellhead fitting or the like, comprising an annular body including a plurality of segments disposable between the fitting and pipe, said segments being circumferentially spaced apart and having outer surfaces tapered correspondingly to the bowl for seating thereon and sliding downwardly and inwardly therealong when so disposed, a seal ring of deformable material including a portion supported by the body against downward movement with respect thereto and extending thereacross, a first set of circumferentially spaced apart slip segments each having teeth thereon and supported above the seal ring for movement downwardly with respect to the body segments, a second set of circumferentially spaced apart slip segments each having teeth thereon and suspended from the first set of slip segments radially inwardly of the body segments so that said second set of slip segments are forced inwardly into gripping relation with the pipe upon said inward movement of the body segments and then further inwardly of the pipe upon further inward movement of the body segments, said second set of slip segments being movable downwardly, as the load of the pipe is placed on the second set of slip segments, to move said first set of slip segments downwardly with respect to the body segments and thereby deform said seal ring into sealing engagement between the pipe and fitting, and means responsive to deformation of the seal ring to move said first set of slip segments inwardly into gripping relation with the pipe and then further inwardly of the pipe at a greater rate per unit of downward movement thereof than the corresponding rate of further inward movement of the second set of slip segments.

6. An assembly for hanging and sealing a pipe within and from a downwardly and inwardly tapered bowl of a wellhead fitting or the like, comprising an annular body including a plurality of segments disposable between the fitting and pipe, said segments being circumferentially spaced apart and having outer surfaces tapered correspondingly to the bowl for seating thereon and sliding downwardly and inwardly therealong when so disposed, a seal ring of deformable material including a portion extending across the body and supported by the body against movement downwardly with respect thereto, a first set of circumferentially spaced apart slip segments each having teeth thereon and supported above the seal ring for extension thereacross to confine said ring between said slip segments and body segments and movement downwardly with respect to the body segments, and a second set of circumferentially spaced apart slip segments each having teeth thereon and supported by the first set of slip segments radially inwardly thereof so that said second set of slip segments are forced inwardly into gripping relation with the pipe upon said inward movement of the body segments and then further inwardly of the pipe upon further inward movement of the body segments, said second set of slip segments being movable downwardly with respect to the body segments in downwardly force-transmitting relation to the first set of slip segments, as the load of the pipe is placed upon the second set of slip segments, to move said first set of slip segments downwardly with respect to the body segments and thereby deform the seal ring into sealing engagement between the pipe and fitting, and said seal ring having a substantially upwardly extending portion disposed outwardly of and in inwardly force-transmitting relationship to the outer surfaces of the first set of slip segments for urging said first set of slip segments inwardly into gripping relation with the pipe and then further inwardly of the pipe, in response to deformation of said seal ring into sealing engagement between the pipe and fitting, at a greater rate of downward movement thereof than the corresponding rate of further inward movement of the second set of slip segments.

7. An assembly of the character defined in claim 2, including a seal ring of deformable material including a portion supported by the body in position to be deformed into sealing engagement between the pipe and fitting upon said downward movement of the second set of slip segments with respect to the body segments.

References Cited in the file of this patent

UNITED STATES PATENTS

| | | |
|---|---|---|
| 2,426,371 | Penick | Aug. 26, 1947 |
| 2,496,190 | Works | Jan. 31, 1950 |
| 2,508,003 | Works | May 16, 1950 |
| 2,553,838 | Allen et al. | May 22, 1951 |
| 2,563,851 | Lundeen et al. | Aug. 14, 1951 |
| 2,589,483 | Eckel et al. | Mar. 18, 1952 |
| 2,683,046 | Allen | July 6, 1954 |
| 2,689,139 | Jones et al. | Sept. 14, 1954 |
| 2,690,344 | Allen | Sept. 28, 1954 |
| 2,824,757 | Rhodes | Feb. 25, 1958 |